United States Patent [19]
Veldkamp et al.

[11] Patent Number: 4,846,552
[45] Date of Patent: Jul. 11, 1989

[54] METHOD OF FABRICATING HIGH EFFICIENCY BINARY PLANAR OPTICAL ELEMENTS

[75] Inventors: Wilfrid B. Veldkamp; Gary J. Swanson, both of Lexington, Mass.

[73] Assignee: The United States of America as represented by the Secretary of the Air Force, Washington, D.C.

[21] Appl. No.: 157,087

[22] Filed: Feb. 9, 1988

Related U.S. Application Data

[63] Continuation of Ser. No. 852,587, Apr. 16, 1986, abandoned.

[51] Int. Cl.$^4$ ................................. G02B 5/18
[52] U.S. Cl. .................. 350/162.2; 250/492.1; 350/3.61; 350/162.17; 350/320
[58] Field of Search ............ 350/3.61, 162.2, 162.22, 350/162.23, 162.17; 250/492.2, 492.22

[56] References Cited

U.S. PATENT DOCUMENTS

| | | | |
|---|---|---|---|
| 3,328,192 | 6/1967 | Soules | 117/37 |
| 3,337,945 | 8/1967 | Mooney | 29/423 |
| 3,814,498 | 6/1974 | Tomlinson, III et al. | 350/96 WG |
| 4,305,666 | 12/1981 | Becherer et al. | 350/3.61 |
| 4,360,582 | 11/1982 | Taguchi et al. | 430/260 |
| 4,360,586 | 11/1982 | Flanders et al. | 350/162.2 |
| 4,401,367 | 8/1983 | Grantham et al. | 350/162.22 |
| 4,678,919 | 7/1987 | Sugishima et al. | 250/492.22 |
| 4,712,013 | 12/1987 | Nishimura et al. | 250/492.2 |

FOREIGN PATENT DOCUMENTS

| | | | |
|---|---|---|---|
| 58-106828 | 6/1983 | Japan | 250/492.22 |
| 58-125827 | 7/1983 | Japan | 250/492.22 |

OTHER PUBLICATIONS

Beasley et al., "Electron-Beam Pattern Generator," *Philips Technical Review*, vol. 37, No. 11/12, pp. 334–346 (1970).
Wilson et al., "Automatic Electron Beam Fabrication of Micron-Size Devices," *Conference on Scanning Electron Microscopy*, Part IV, pp. 659–668 (Apr., 1976).
Veldkamp et al., "Developments in Fabrication of Binary Optical Elements," SPIE, vol. 437, International Conference on Computer-Generated Holography, 1983, pp. 54–59.

*Primary Examiner*—John K. Corbin
*Assistant Examiner*—Martin Lerner
*Attorney, Agent, or Firm*—William G. Auton; Donald J. Singer

[57] ABSTRACT

The high diffraction efficiency regime of binary gratings occurs at periodicities on the order of a wavelength in order to produce grating which diffract radiation with efficiencies of greater than 90%, a fabrication procedure is disclosed which uses halographic and very large scale integration techniques which allow fine control over the periodicity and depth parameters to produce binary planar optical elements having a ratio of $\lambda/T$ greater than one (where $\lambda$ equals the wavelength of an illuminating wavefront, and T equals the grating periodicity). Additionally, the disclosed process produces high optical quality diffractive elements with phase precision of as high as $\lambda/100$. These diffractive elements include laser beam multiplexers, beam profile shapers, and binary lenses which are lossless optical transfer functions.

1 Claim, 7 Drawing Sheets

X-DIRECTION →

701

Y-DIRECTION ↑

FIG. 10
FOCAL PLANE SCAN 200 x 200 μm

LEGEND

FOCAL LENGTH —— 5 cm
APERTURE SIZE —— 1.5 cm

DIFFRACTION LIMITED
SPOT SIZE —— 2.44 λ F/A

- CALCULATED — 86 μm
- MEASURED —— 95 μm

FIG. 11

METHOD OF FABRICATING HIGH EFFICIENCY BINARY PLANAR OPTICAL ELEMENTS

STATEMENT OF GOVERNMENT INTEREST

The invention described herein may be manufactured and used by or for the Government for governmental purposes without the payment of any royalty thereon.

This application is a continuation of application Ser. No. 852,587, filed Apr. 16, 1986, abandoned.

BACKGROUND OF THE INVENTION

The present invetion combines advances in lithography and electromagnetic grating theory to produce highly efficient diffractive optical elements on planar dielectric or metallic substrates. The present invention includes the production of highly efficient (greater than 90%) and high quality (with precisions near $\lambda/100$) diffractive optical elements on planar dielectric or metallic substrates, using very large scale integration (VLSI) techniques which are currently used in the fabrication of integrated circuits (IC).

Diffractive optical elements have developed to the stage of becoming practical components of optical systems. These elements can not only replace conventional refractive and reflective elements but also, in many case, perform functions not even possible with conventional elements. Elements have been made to operate as $CO_2$ laser beam shapers, laser beam multiplexers, and two-dimensional scanners, all uniquely suited to their application.

A number of independent developments (one in EM-optics theory, another in pattern lithography and a third in large scale dry reactive ion-etching techniques), have made it feasible to generate binary holographic gratings with blaze-like characteristics and near perfect efficiency.

Electromagnetic theory predicts that binary gratings with the proper parameters can achieve a first order diffraction efficiency of nearly 100% over wide wavelength bandwidths and field-of-views. If the periodicity of the grating is on the order of or smaller than the radiation wavelength, all of the orders become evanescent except for the zero and +1st orders. By choosing the depth to period ratio and duty cycle properly, the zero order can be suppressed as well, placing virtually all of the incident radiation into the remaining and 1st diffracted order.

The diffraction efficiency exceeds the limits set by Fourier optics because of the large $\lambda/T$ ratio (T=grating periodicity) which places the diffraction well into the EM-optics domain. Implicit in the Fourier optics assumptions are the Huygens' and Kirchoff's assumptions of scalar diffraction theory where light propagates unperturbed to various portions of the grating surface, then is specularly reflected, constructively or destructively interferes, and imposes the desired phase and amplitude modulation on the reflected wavefront. When the grating periodicity approaches the wavelength of the illumination, the concept, of these specular reflections no longer has any meaning. On these binary gratings operating in the EM dimension gratings all diffraction orders, except the plus-first an zeroth orders, can be made to disappear by diffraction into the substrate material. These suppressed or evanescent orders then will redistribute most of their energy into the remaining radiative order. Therefore, like conventionally ruled echelle-type gratings, where unwanted orders are suppressed by the asymmetry in the grating profile, these gratings behave in a blaze-like (single diffraction order) manner. The sole asymmetry in the use of these binary gratings is in their off-axis illumination. These gratings with their two-level (binary) laminary relief profile can be used with either transmissive or reflective substrate materials, provided the profile depth is chosen appropriately.

The large scale integration advances that allow IC fabrication techniques to be used to produce high efficiency optical elements include the high-resolution and high-accuracy lithographic pattern generation techniques such as projection printing, electron beam an X-ray writing. The improved accuracy and resolution in VLSI pattern generation and device fabrication have made it feasible to computer generate holographic masks with space-bandwidth products of $10^{10}$, or as high as $10^{12}$, half-micron linewidths and 100Å line acuity.

The improvements in dry-etching techniques include ion bombardment and reactive ion etching, which the present invention uses in the production of optical elements. The great effort expanded by the integrated circuit industry has provided the capability to produce binary phase relief patterns with 0.5 $\mu$m periodicities and 0.1 $\mu$m accuracies over areas with 20 cm or more diameter. All of the above advances are prerequisites to using IC production techniques to fabricate highly efficient and high quality diffractive optical elements.

The present invention incorporates the developments mentioned above into the production of highly efficient diffractive optical elemntes on planar dielectric or metallic substrates. These optical elements operate in the EM domain when the grating spatial frequency (1/T) exceeds the spatial frequency of the illuminating wavefront, i.e., $T \leq \mu$ and include infrared planar lenses and high speed scanners.

The use of high resolution computer generated lithography makes it possible to manufacture these optical elements (1) by electromagnetic diffraction theory to implement an efficient carrier relief profile, an (2) by use of conventional Fourier optics rules to place a spatial modulation on that carrier. In view of the foregoing discussion, it is apparent that the present invention includes a new method of manufacturing highly efficient diffractive holographic opitcal elements using VLSI techniques normally used in the fabrication of integrated circuits.

SUMMARY OF THE INVENTION

The present invention includes the production of highly efficient and high-quality diffractive optical elements on planar dielectric or metallic substrates. The diffractive optical elements, of the present invention have diffractive efficiencies greater than 90%. Additionally, these optical elements are produced with high quality; having wave phase precision in their binary relief patterns near $\lambda/100$.

The process of producing these optical elements begins with the generation of a pattern on a binary mask using state-of-the-art equipment used to generate lithographic mask patterns for integrated circuits. Standard pattern generators in the art use either a laser, electron or ion beams to trace the pattern in a positive resist on the surface of a glass substrate.

Current electron beam technology allows for feature sizes as small as 0.25 $\mu$m, and positional accuracy of ±0.05 μm. As mentioned, the onset of the high diffraction efficiency regime of binary gratings occurs at periodicities on the order of a wavelength.

The pattern generated on the mask is subsequently transferrred to a resist-coated substrate an given a reflective coating to form the reflective and diffractive optical element. In a particular embodiment layer of resist is spun onto the substrate to a thickness corresponding to the desired depth of the final surface relief grating. Next, a thin layer (500Å) of chrome-aluminum is sputtered an on top of this, a thin layer (1000Å) of resist is applied. A conformable mask, made by contact printing with the e-beam generated mask, is contact printed under vacuum on the top thin layer of resist. The exposed substrate is then wet-etched so that the binary pattern is transferred to the top thin layer of metal. The substrate is then reactive ion etched in an oxygen plasma which selectively etches the resist, leaving the remaining metallization intact. Reactive ion etching is a highly anisotropic process, so that the high edge acuity of the desired rectangular profile is preserved. The final step of the process is to evaporate a thin film of gold onto the relief pattern to achieve the high conductivity necessary for efficient diffraction. During evaporation, the substrate is rotated between approximately ±45° to assure uniform coating of the sidewalls and corners.

The diffractive optical elements produced, in the present invention achieve a high diffraction efficiency (greater than 90%), and a high quality with a precision in the binary relief profile of nearly $\lambda/100$. The diffraction efficiency of optical elements fabricated by the process of the present invention will exceed the efficiency limits set by Fourier optics and experienced with the use of prior art holographic elements because of a comparatively large $\lambda/T$ ratio (where T equals the periodicity of the reflective grating) which serves to place the diffraction well into the electro-magnetic (EM) optics domain.

It is a principal object of the present invention to produce highly efficient an high diffractive planar optical elements.

It is another object of the present invention to produce IR optical elements of low cost and low weight.

It is another object of the present invention to produce these highly efficient and high-quality diffractive optical elements using techniques normally used in the fabrication of integrated circuits.

It is another object of the present invention to produce near-perfect-efficiency diffractive optical elements bases on EM theory applied to holographic gratings.

These together with other objects features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes the production of highly efficient and high-quality diffractive optical elements, on planar substrates. These optical elements include beam profile shaper elements, beam multiplexers, planar lenses, and IR filters etc. Some examples of these elements are described below.

Figure 1:
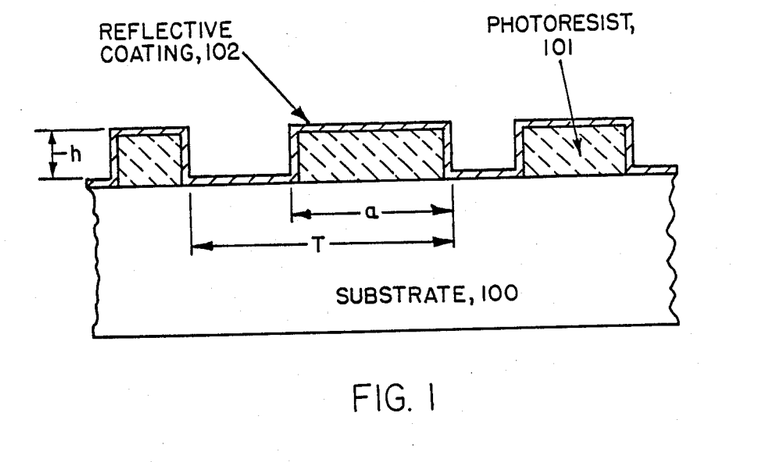
FIG. 1 is an illustration of a segment of a binary grating produced by the present invention.

FIG. 1 is an illustration of a segment of a binary grating that is produced by the present invention. The grating is fabricated on a substrate 100 which may be composed of: metal, quartz, glass, plastic or silicon. In general, the grating is fabricated directly on the substrate. In the embodiment of FIG. 1, the grating itself is formed by a photoresist 101 and a reflective coating 102. However, dielectric gratings without metallic coatings are viable. The rectangular groove grating has an aspect ratio defined by a/T and a groove depth h.

Note that the embodiment of FIG. 1 is only but one example of the present invention. After fabrication, typical binary gratings would have the grating etched into substrate itself and coated with the reflective coating without the photoresist, which forms the grating walls in FIG. 1.

By selecting the depth-to-period ratio and periodicity properly, first order diffractive efficiencies of nearly 100% are achieved. The grating is defined as having a periodicity T, depth of h, and wall width of a, for diffracting an incident beam with a wavelength of $\lambda$. The process of the present invention allows the fabrication of optical elements (such as beam multiplexers, planar lenses etc.) while retaining the diffractive high efficiency, because of the large $\lambda/T$ ratio, which is greater than about 0.9, a ratio of $\lambda/h$ which equals about 0.25, and a ratio of a/T which equals about 0.5. The application of VLSI fabrication techniques, computer generated holography and reactive ion etching, allows the binary relief gratings of these elements to be produced with precisions of near $\lambda/100$.

Figure 2:
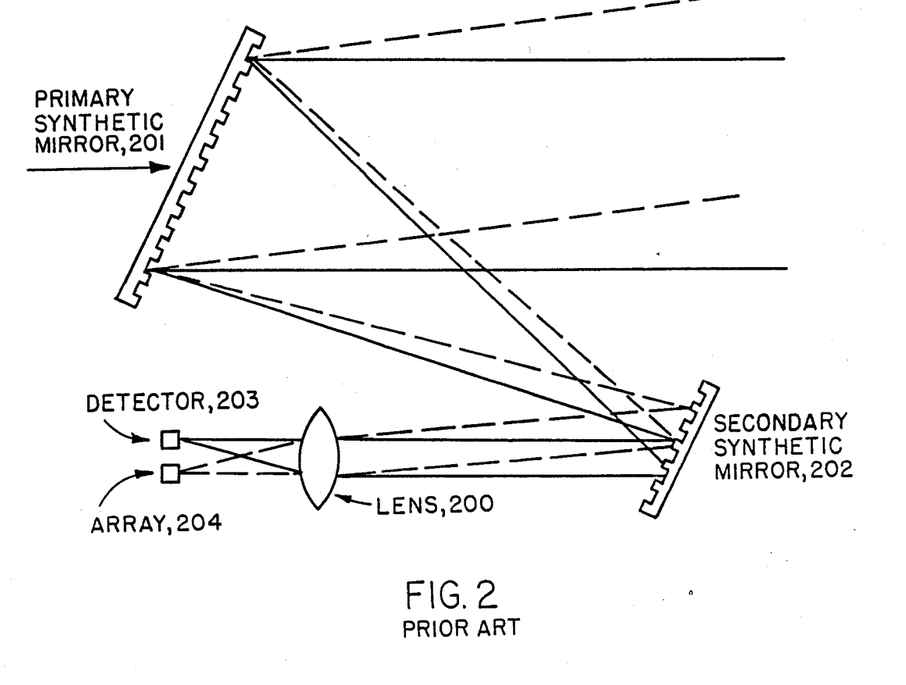
FIG. 2 is a sketch of a diffractive telescope using binary gratings produced by the present invention.

FIG. 2 is a sketch of a monochromatic binary grating telescope, which is intended to use binary gratings produced by the present invention as synthetic off-axis lenses 201 and 202 in a Ritchey-Cretien configuration.

Using the process of the present invention, two binary gratings have been produced for use in a simple afocal telescope similar to that of FIG. 2 for use in optical laser radar systems. The telescope has a 2½ inch entrance aperture and a magnification of 5. One F/5 binary lens had a diffraction efficiency of 97%. Both gratings were designed for use in a CO₂ laser radar emitting at a wavelength of 10.6 μm. This telescope served to illustrate that because of the high efficiency of these elements, it now becomes practical to consider using more than a single diffractive element in a system.

Figure 3:
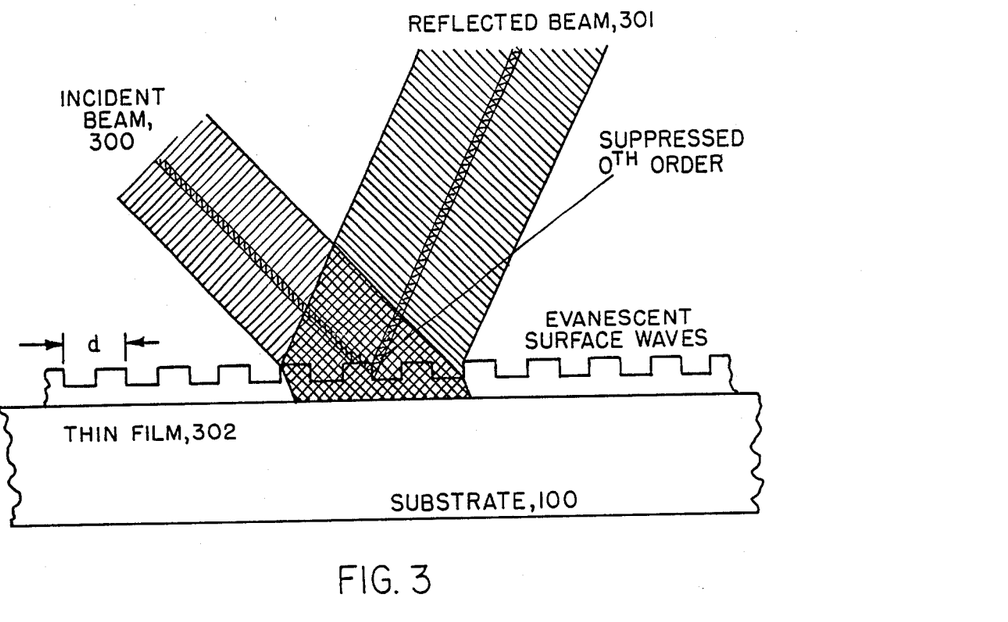
FIG. 3 is an illustration of the binary grating of the present invention as operated in the EM domain. ($\lambda \geq T$).

The purpose of FIG. 3 is to illustrate the redistribution of energy from evanescent to remaining radiating diffraction orders.

Present electromagnetic resonance theory predicts that laminary, perfectly conducting, binary gratings are 100% efficient for TM or S polarizations at a broad range of angles or equivalently a range of wavelengths.

Figure 4A:
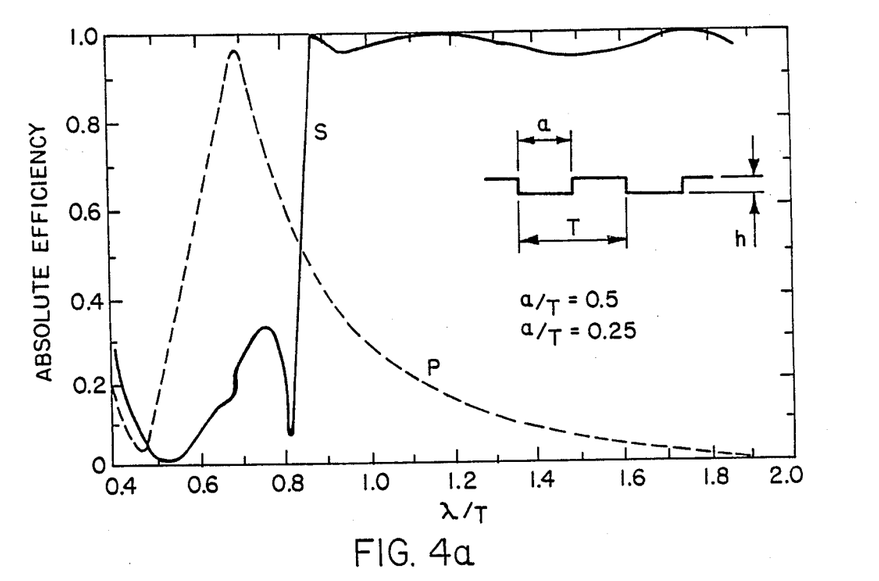
FIG. 4a is a chart of the calculation of absolute efficiency of binary gratings with a/T =0.5 and h/T=0.25 for P and S polarizations.

In the gratings planned for usage with the laser radar diffractive telescope of FIG. 2, $\lambda = 10.6$ μm is the wavelength of the incident laser beam. The details for the primary and secondary synthetic lenses will be presented later, but for the present, the aspect ratio (a/T) of the preferred embodiment for a diffraction grating is 0.5; and the ratio of h/T is 0.25. The blazing condition for this grating, are shown in FIG. 4a in the form of a plateau S polarization radiation in the diffraction efficiency curve.

Gratings designed as described above have a theoretical 100% efficiency, at a single polarization design frequency, and above 90% efficiency for both polarizations when not more than 10% of the fractional bandwidth at the design frequency is required. The simultaneous high efficiency for both S and P polarizations can be achieved by proper aspect ratio designs.

As mentioned above, the electromagnetic resonance theory, incorporated in the present invention, predicts high-efficiency blaze-like diffraction on straight-line binary relief gratings. On these gratings all diffraction orders, except the plus-first and zeroth orders, can be made to disappear by Loss Less diffraction into the substrate material. In addition, the zeroth order can be suppressed independently by control of the relief depth of the porfile. These suppressed or evanescent orders then will redistribute most of their energy into the remaining propagating and radiative orders. Therefore, like conventionally ruled echelle-type gratings, where unwanted orders are suppressed by the machined asymmetry in the grating profile, these gratings behave in a blaze-like (single diffraction order) manner. The sole asymmetry in the use of these binary gratings is in their off-axis illumination. These gratings with their two-level (binary) laminary relief profile can be used with either transmissive or reflective substrate materials, provided the profile depth is chosen appropriately (e.g., $\lambda/2n$, phase depth versus $\lambda/4$ depth respectively where n is the refraction index of the substrate machine). For transmissive gratings, typical grating depths are about $\lambda/2n$. For reflective gratings, the depth is typically around $\lambda/4$.

Calculations of binary grating diffraction characteristics, when the grating periodicity approaches the illuminating wavelength ($\lambda/T > 0.9$) and their depth approaches $\lambda/4$, are difficult, even for straight line structures. This wavelength-periodicity-depth regime is defined as the electromagnetic (EM) resonance regime. Yet, binary relief grating structures are very important because of the accuracy and ease with which binary patterns can now be delineated.

FIG. 4a is a chart of the calculation of absolute efficiency of binary gratings with a/T=0.5 and h/T=0.25.

FIG. 4a is applicable to straight-line gratings. The binary gratings fabricated for use in the afocal telescope, similar to that of FIG. 2, were actually two planar binary lenses with focal lengths of 25 cm and 5 cm. If the focal length f of a lens is set to infinity, the pattern reduces to a straight line grating, and the diffraction efficiency of the elements are essentially described by the curve in FIG. 4a. As the distance f is brought in from infinity the straight line pattern is changed into a curved and chirped line pattern. These curves are described in the (x,y) plane by $$m = 1/\lambda \sqrt{x^2 + (y - f\sin\psi)^2 + (f\cos\psi)^2} + y\sin\phi - f\cos\psi \quad (1)$$

where:
m is an integer representing the fringe index number;
f is the focal length of the lens;
$\psi$ is the diffraction angle of the focal point; and
$\phi$ is the angle of incidence of the incident radiation.
As the distance f is made smaller, the curvature of the lines become greater, making the theoretical results in FIG. 4a less applicable.

The diffraction efficiencies of both lenses were measured. A CO₂ laser beam was expanded to illuminate the full lens aperture in the S-polarization state and at the required input angle $\phi$. The efficiencies (first order intensity/incident intensity) for the 25 cm primary and 5 cm secondary focal length elements were 94.1% and 96.4%, respectively.

The same fabrication steps that were used to make the straight line gratings, in the present invention, were used to make the planar lenses. However, generating lens masks using raster e-beam lithography is different from making linear gratings in two ways. First is the pattern quantization of lithographic equipment resulting in the curved lines of the optical equiphase wavefronts being approximated in a staircase fashion. Second is the computational complexity of the lens pattern as compared to a grating. Equation 1 is simple enough to analytically solve for y as a function of m an x. In that form it is computationally fast to step x and m, and arrive at the center fringe locations (x,y). The power of computer generated elements, however, is that very complex optical patterns can be written which cannot be generated optically any other way. For example, an additional phase term, m'(x,y), can be added to the right side of Equation 1, to possibly compensate for an aberration in the binary lens system or at other locations of the optical system. Equation 1 then becomes $$m(x,y) = \sqrt{x^2 + (y - f\sin\psi)^2 + (f\cos\psi)^2} + y\sin\phi - f\cos\psi + m'(x,y)/\lambda \quad (2)$$

and is no longer able to be inverted into an analytical function y(x,m). An iterative routine must be used to solve for the fringe coordinates.

Figure 4B:
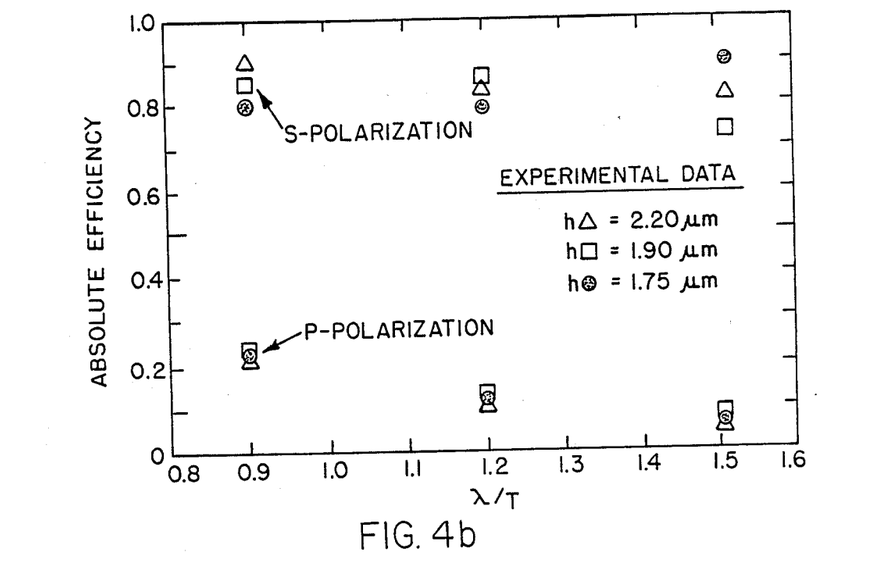
FIG. 4b is a chart of measurements of absolute efficiency of gratings for S polarization an P polarization.

FIG. 4b is a chart of experimental data of measurements of absolute efficiency of gratings for S polarization and P polarization. As shown, efficiency measurements were made for gratings with three different $\lambda/T$ ratios (0.9, 1.2 and 1.5) and three different grating heights (2.20, 1.90 and 1.75 micro meters).

Figure 5:
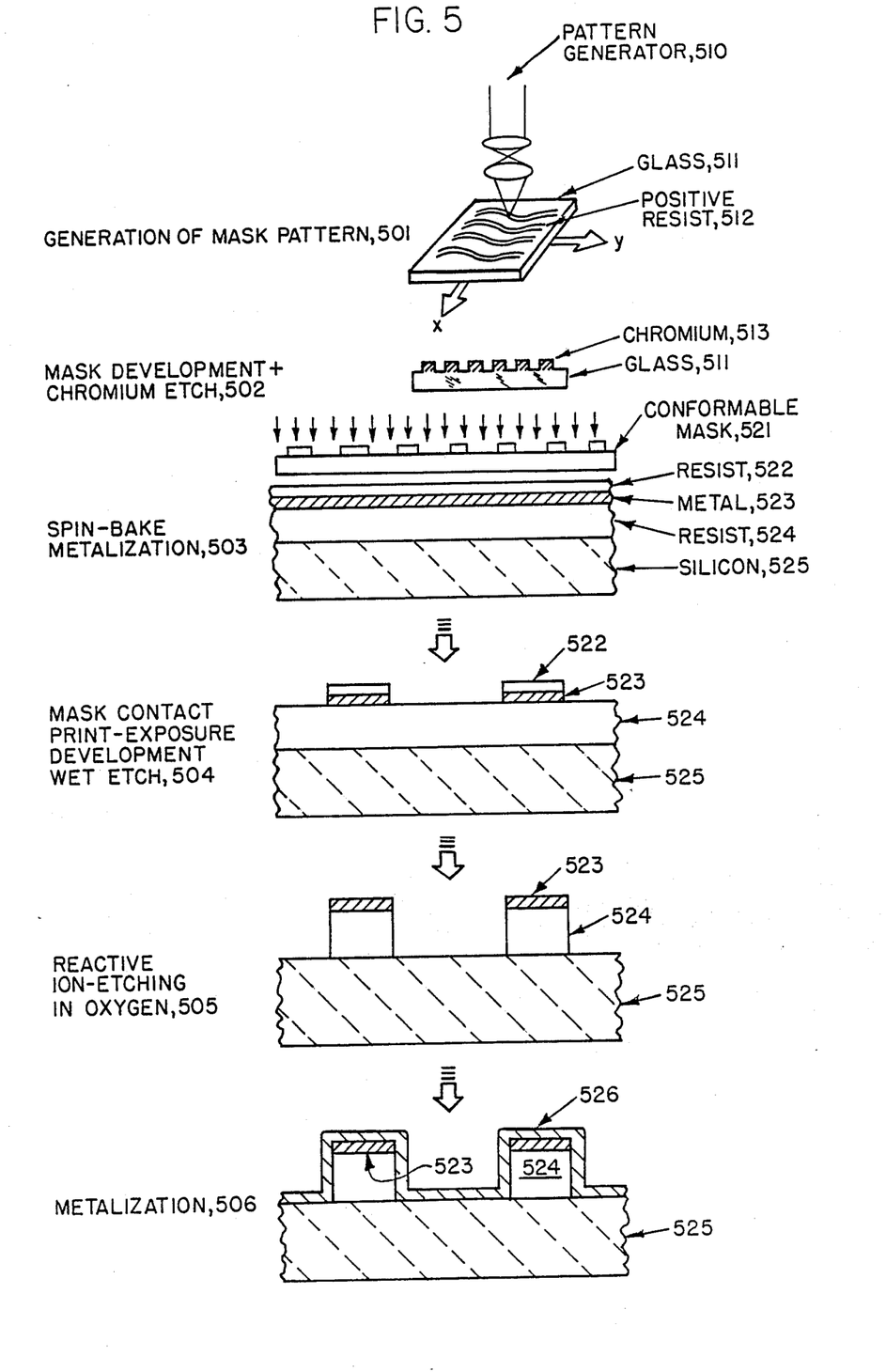
FIG. 5 is a sketch of a fabrication process of the present invention.

FIG. 5 is a sketch of a particular fabrication process in the present invention to manufacture binary planar optical elements using techniques normally used to fabricate electronic integrated circuits.

The first step of the process 501 is the generation of a lithographic pattern for a mask using state-of-the-art equipment used to generate patterns for IC masks. Step 501 shows a pattern generator 510 exposing the holographic grating pattern in the positive resist 512 which is deposited upon a glass substrate 511.

In the one embodiment of the present invention, an e-beam generator was used to trace the binary patterns for the mask that would eventually be transferred (contact printed) to each optical element. Standard pattern generators in the art use either a laser, electron or ion-beams to trace the pattern in a positive resist 512 on the surface of a glass substrate 511. The masks were produced on Balzer master-grade high resolution positive resist plates.

The pattern on the mask of binary optical elements is formed using a set of etched chrome boxes that represent the binary groove profiles of the binary grating or lens. Each box is known as a rectangular flash and is about 4.5×60 um in size in our telescope application. Each rectangular flash will become a darkened area on the otherwise transparent substrate of the mask. Also, each rectangular flash is rotated by an angle calculated from a corner reference phase algorithm to provide the necessary phase distribution that must be implemented on the holographic pattern of the binary grating. The ideal center coordinates of each rectangle are determined from Equation 1 and fed to the e-beam machine. It is apparent that each fringe has to be sampled in drawing the pattern. Therefore, the number of flashes in the y-dimension is directly determined by the number of fringes across the aperture. Also, the size of each flash in the y-dimension, $\Delta y$, is set by the high efficiency requirement of a 50% duty-cycle. The accuracy and locations at which flashes can be positioned in this direction are limited by both software and hardware constraints. This results in a quantization step size, $\Delta y'$, which is on the order of 0.1 $\mu$m for the best existing e-beam machines.

The effect of this quantization on the phase of the wavefront can be estimated by modeling the quantization as additive random noise. The resulting root mean square phase error is $$\Phi \text{ RMSE} = \frac{\pi}{N_P \sqrt{3}} \quad (3)$$

where $N_P$ is the number of phase quantization levels. Because the distance between each fringe represents a $2\pi$ phase change, the number of phase quantization levels, $N_P$, is equal to the smallest periodicity present on the element divided by the quantization step size. For example, the two lenses that we constructed had a smallest periodicity of 8.6 micrometer. The e-beam generator we used had an atypically large quantization step size of 0.5 $\mu$m. This resulted in an $N_P$=17.2 and an RMS phase error of $\pi/30$, or $\lambda/60$ in the y-dimension. In the x-dimension, the quality of the diffracted wavefront is determined by the flash length $\Delta x$. Because this dimension is orthogonal to the spatial carrier direction, the phase error can conceivably be made much smaller than the error in the y-direction. The price paid for doing so, however, is in computational time and expense. The logical choice is to determine a $\Delta x$ that results is a wavefront with a specified quality. Choosing a $\Delta x$ that results in smaller phase error than in the y-dimension does not significantly improve the over all quality of the element, except in special anamorphic applications.

The minimum $\Delta x$ attainable with existing technology is approximately 1 $\mu$m. Thus, if one is willing to accept the additional time and expense, the wavefront quality could conceivably be increased to approximately $\lambda/400$ in the x-dimension for an F/5$\lambda$=10.6 $\mu$m lens. The x-dimensional phase quantization is summarized in FIG. 7 and an SEM photograph showing the quantization of an actual lens is shown in FIG. 8.

Figure 10:
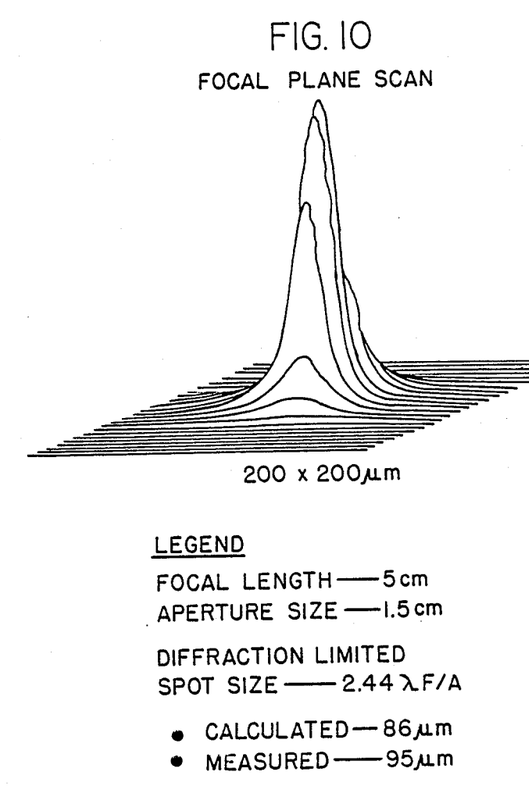
FIG. 10 is a measurement of the point-spread-function of one of the lenses.

The point spread function of each lens was measured experimentally. The lenses were illuminated with 10.6 $\mu$m radiation at the proper angle, and a pyroelectric detector with a 10 $\mu$m aperture was scanned through the focal plane. A plot of the focal plane scan at one of the lenses is shown in FIG. 10. The point spread function corresponds closely to the diffraction limited value. The discrepancy and error of the measured value can be attributed to two effects. The detector, having an aperture of approximately 10% of the distance being measured, introduced a measurement error. Secondly, the incident $CO_2$ beam had a Gaussian profile rather than uniform profile resulting in a slightly broader point-spread function.

Figure 11:
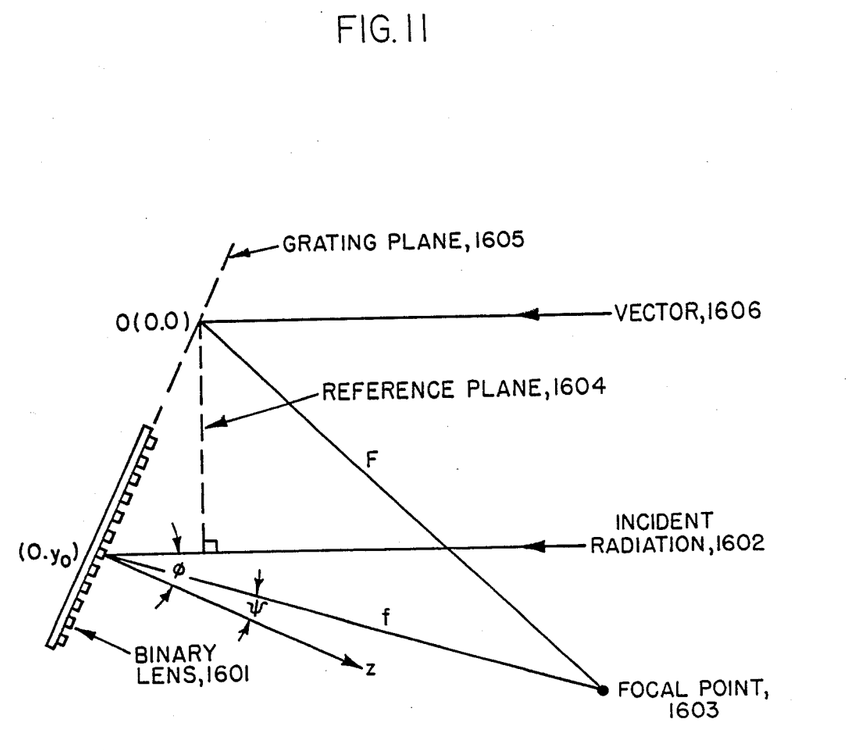
FIG. 11 is a sketch of the geometrical operating parameters of a binary lens.

To fully understand the design parameter of the mask, it is necessary to consider the parameters of the binary lens that will be produced by the mask, in this example. FIG. 11 is a sketch of the binary lens 1601 with its lens parameters depicted.

The planar binary lens 1601 is depicted as having a Z plane normal to its surface. This lens 1601 diffracts incident radiation 1602 to a focal point 1603. The incident radiation 1602 approaches the binary lens 1601 at an incidence angle $\phi$ from the Z plane. The focal point 1603 sits at a diffraction angle $\psi$ from the Z plane, and is at a distance known as the focal length, f, from the surface of the binary lens 1601.

The reference plane 1604 is normal to the incident radiation 1602; and the grating plane 1605 is the plane in which the binary lens 601 is located. The off-axis distance, F, is the distance from the focal point 1603 to the point of intersection between the reference plane 1604, grating plane 1605, and a vector 1606 which is parallel with the incident radiation 1602.

The binary lens 1601 of FIG. 10 has an off-axis lens design with a spatial carrier frequency 1/T centered at $\lambda/T$=1.18 that covered a limited chirp bandwidth (1.10<$\lambda/T$<1.23) for use with $CO_2$ laser illumination at 10.6 $\mu$m.

With these guides, the process of FIG. 5 was used to generate variety of 5 cm diameter lenses on Si substrates with a carrier at 9.0 $\mu$m. An algorithm of expression (1) is used to simulate the interference between a uniform plan wavefront and an off-axis diverging wavefront to generate a pattern mask.

The transformation H(x,y) of a uniform planewave A exp(jKz) into a converging one with focal length f is $$H(x,y) = \exp[-2\pi j \sqrt{(x_2 + y^2 + f^2)/\lambda}\,] \quad \text{Equation 5}$$

and has a spatial frequency along the y-direction, for example, of $$(1/2\pi)\delta H(x,y)\delta y = y/[\lambda \sqrt{(y^2 + f^2)}] \quad \text{Equation 6}$$

Therefore, the transform exhibits a near linear frequency chirp with max and min spatial frequencies of $(8.6 \ \mu m)^{-1}$ and $(9.6 \ \mu m)^{-1}$ at the edges of the lens.

The positions of the exposures (rectangular flashes) on the mask are calculated from the relative phases with respect to the origin O between a tilted planewave and a diverging spherical wavefront. FIG. 11 represents the geometry of the problem. The grating is tilted about the x-axis at an angle $\phi$ with respect to the incident radiation, and for convenience the origin is located at the point on the grating where a diffracted ray would pass through the focus. In order for all the rays striking the grating surface to be brought to the same focus, the grating surface must be designed to compensate modulo $2\pi$ for the difference between a reference path length F and the path of an arbitrary beam propagating from the input plane to the focal point. Using $\Delta\theta_y = 2\pi[\Delta y/\lambda]$ the phase distance is $$\theta = (2\pi/\lambda)[\sqrt{x^2 + (F\sin(\psi) - y)^2 + (F\cos(\psi))^2} + \quad (7)$$
$$y \sin(\theta) - F$$

where the focal length f and the reference length F are related by $f = F[\cos(\phi)/\cos(\psi)]$.

The first two terms in Eq. 7 are the phase distributions due to the interference of a spherical and a plane wavefront. The last term represents the phase term relative to the chosen origin. Eq. 7 can be used to produce a binary grating having an a/T ratio of 0.5 by etching the surface when the fraction of $\theta/2\pi$ is between 0 and 0.5.

The lithographic pattern generation algorithm for planar binary lenses is then as follows. Calculate the distance from the mask center coordinate to flash center at the corner of the mask. Find the corner reference phase and round it off to the nearest $\pi$. Move along the y-axis on the same x-center coordinate incrementing the y-coordinate each time by a grating period and the phase $\theta$ by integer $2\pi$. Solve the resulting equation for y with an itterative routine such as the Newton method. Draw a rectangular flash around the established x-y center coordinate and repeat the process by incrementing the phase $(2m+1)\pi$ and the center y-coordinate by $(n+1)T + y_o$ until the top of the mask is reached, i.e., $(D/T-1)$ times. After that, increment the x-coordinate and repeat the process in a serpentine fashion. In addition to the size and the center coordinates, the rotation of each flash must be specified. The rotation covers a field of $\pm 5.4°$ at the edges of the mask with a 0.1° angular quantization. The angle of each exposure is calculated from:

$$\frac{d\theta}{dx} = \frac{(2\pi/\lambda)x}{\sqrt{x^2 + (F\sin(\psi) - y)^2 + (F\cos(\psi))^2}} \quad (8)$$

$$\text{and } \alpha = \frac{T}{2\pi} \left. \frac{d\theta}{dx} \right|_{x_i, y_i} \quad (9)$$

where T is the local periodicity, which in turn is evaluated by substracting two consecutive flash center coordinates, $y_i - y_{i+1}$, as they are evaluated in Equation 7. Note that this pattern has y-axis as well as pos-neg exposure symmetry.

Table 1 is a list of the lens parameters that were used in the procedure described above.

TABLE 1

| Lens Parameters | |
|---|---|
| Focal Length - f | 25 cm |
| Optics Diameter - D | 5.1 cm |
| Off-Axis Distance - F | 35.8 cm |
| Angular Quantization | 0.1° |
| Number of Flashes | $3.10^6$ |
| Flash Size | 4.5 × 30 um |
| Incidence Angle - | 47.6° |
| Diffraction Angle - | 26.1° |

Returning to FIG. 5, the second step of the mask fabrication process is the chromium etch step 502. Chromium etching is a technique well known in the art. This step results in a finished mask consisting of the glass substrate 511 with the grating pattern formed on its surface 513 where each flash was placed by computer controlled lithography. Note that the grooves etched away are transparent areas of the mask representing the lens of the relief grating, and that the opaque areas 513 represent the highs of the relief grating.

The third step of the fabrication process is the spin-bake metalization step 503, in which a substrate is coated with a resist, and prepared for fabrication into an optical relief element. First, a thick layer of resist 524 is spun onto the substrate 525 at an appropriate thickness. Next, a 400Å aluminum layer 523 is evaporated onto the thick resist 524 which is, in turn, coated with a top thin layer of positive resist 522. Finally, after placing the substrate 525 with all its layers 522–524 beneath the conformable mask 521 that was produced by the first two steps 501 and 502 of the fabrication process, then the fourth step 504 can be initiated. The metal layer 523 in FIG. 5 is shown to be aluminum, which has a relatively low etch rate in nearly all useful reactive gases, e.g., (Si:Al =60:4), and is a better thermal match to the underlying resist than chromium. This is one of many possible processing steps commonly available in the electronics industry.

The fourth step of the fabrication process 504 involves using the mask to repeatedly contact print the binary grating pattern on resist coated substrates to manufacture diffraction gratings or other binary optical elements. By placing the mask upon each resist coated substrate 525, and exposing the mask to incoherent ultraviolet light, the grating pattern is contact printed onto the resist 522. Next, the mask pattern is wet etched into the aluminum, which leaves the thin resist layer 522 and metal layer as depicted at step 504 in FIG. 5.

The fifth step 505 is to reactive-ion etch the element pattern onto the thick layer of resist 524 with ion-bombardment. This ion milling procedure results in the formation of the binary grating in the resist 524 deposited upon the substrate 525. In the embodiment of the process shown in FIG. 5, the pattern of the desired optical element is reactively etched into the thick resist 524 down to the Si substrate 525 using pure oxygen plasma at $10^{-2}$ Torr. In another embodimet the pattern can be transferred entirely into the substrate material without any residual resist remaining on the surface.

The fabrication process of FIG. 5 depicts two separate etching steps: the wet etch 504, and the reactive ion-etching step 505. The reason that the thick resist 524 is etched with the reacitve ion-etching step 505 is that pattern transfer by wet etchants is limited to shallow 5 μm and higher features. Over large areas, conventional wet etchants cannot provide the transfer fidelity and depth uniformity necessary for optical elements. Reactive ion-etching avoids the two main drawbacks of residue redeposition and profile faceting of the more conventional ion-beam and plasma etching techniques. With reactive ion etching, redeposition is absent as long as all the etched species are converted into volatile products. Undercutting, as in liquid or plasma etching, is also absent since etching takes place only where ions are actually hitting the surface. Faceting, always a problem in non-reactive etches, is nearly negligible.

The final step of the fabrication process is the metalization step 506, in which the grating profile is coated with a Cr-Au layer. To cover the vertical groove walls adequately, a chromium prep-layer is E-beam sputtered at a thickness of about 50Å, followed by the gold reflection coating at a thickness of 1,000Å. The metal coatings are sputtered onto the pattern while rotating it between ±45° in a plane orthogonal to the grooves. Note that any reflective metal used in the art, such as aluminum and chromium, may be used as the reflective layer 526 of the optical element.

In another embodiment of the fabrication process of the present invention, steps 501 and 502 are accomplished as shown in FIG. 5 to generate the mask. However, in this alternative fabrication process the contact printing 503 and ion milling 504 steps are replaced by the more direct technique of masked ion-beam lithography.

Figure 6:
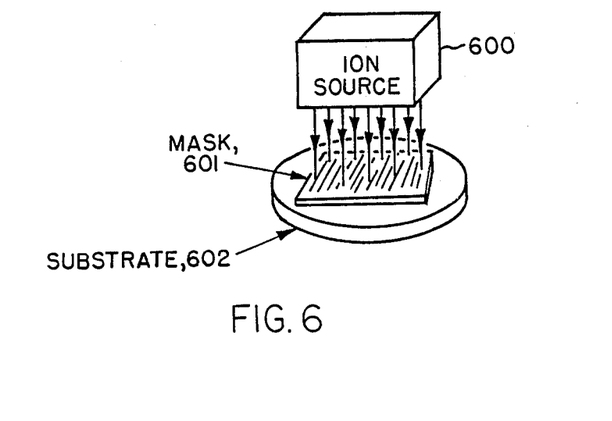
FIG. 6 is a sketch of the masked ion-beam lithography technique used in an alternate embodiment of the process of the present invention.

FIG. 6 is a sketch of the masked ion-beam lithography technique as applied by the present invention. In this technique the mask 601 formed from steps 501 and 502 of FIG. 5 is placed directly over the resist coated substrate 602, then, by exposing the mask to the ion source 600, the diffraction grating is etched into the resist on the substrate 602.

Existing LSI technology also permits the use of computer controlled deflection of ion-beams to directly fabricate optical elements in much the same fashion as the pattern generator 510 generates the mask in step 501 of FIG. 5.

While the etching is depicted as being accomplished by an ion source 600 in FIG. 6, etching may actually be accomplished using any source of: electron beams, laser and x-ray beams, as well as ion beams.

Figure 7:
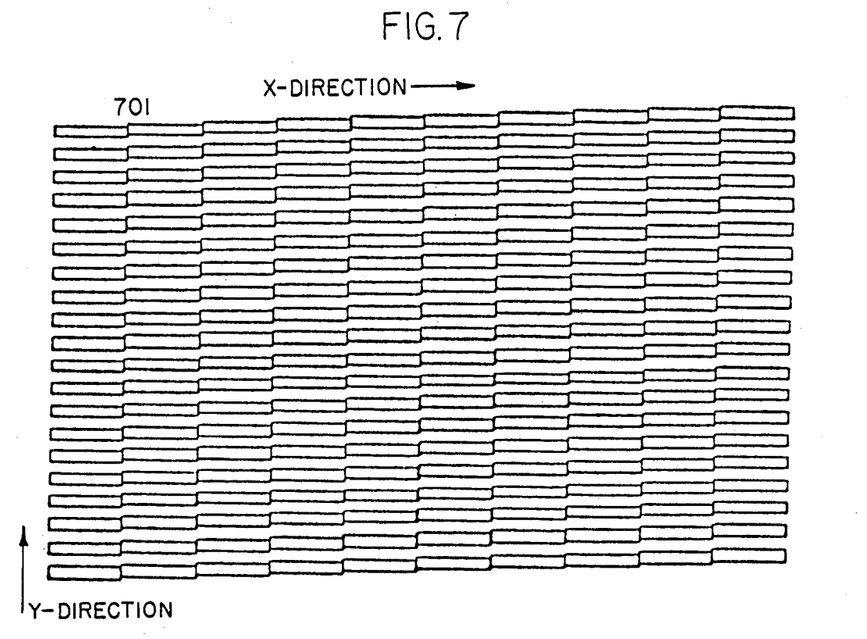
FIG. 7 is a sketch of magnified section of the mask pattern composed of rectangular flashes.
Figure 8:
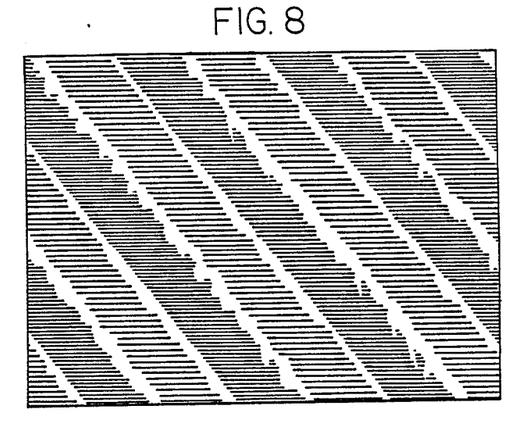
FIG. 8 is a sketch of a highly unmagnified section of the substrate relief profile produced by the reactive ion-etching process.

FIG. 7 represents the concept of wavefront quantization and associated wavefront errors inherent in the mask pattern produced by the pattern generator. Each box 701 represents a rectangular flash whose actual size is about 4.5×30 μm in our telescope lens application.

FIG. 8 is a sketch of a Ritchey-Chretien type telescopic lens surface.

Figure 9:
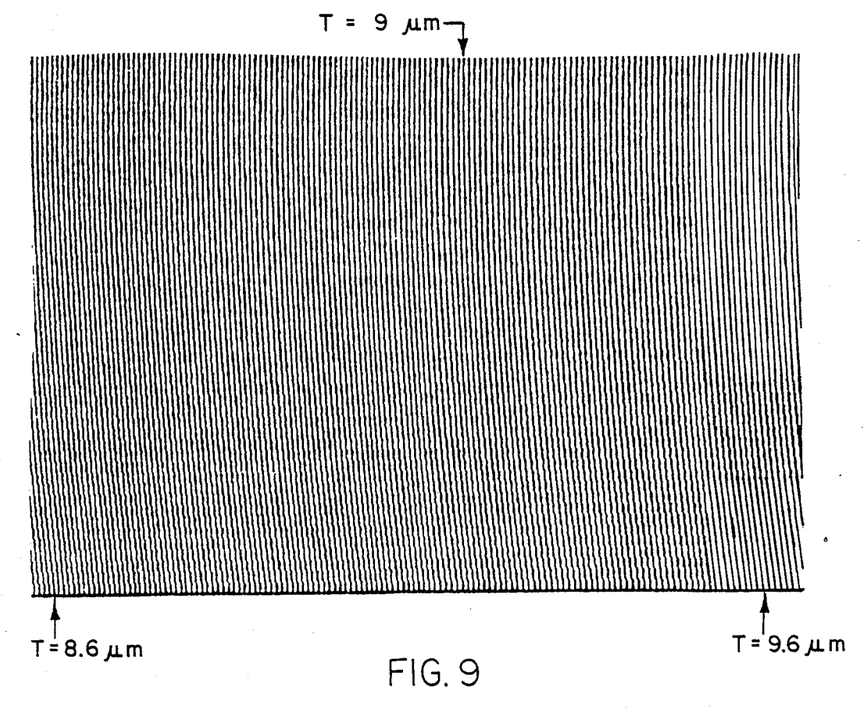
FIG. 9 is a sketch of a magnified section of a planar lens mask-pattern.

FIG. 9 is a sketch of a section of the binary grating that forms the primary synthetic lens 201 of FIG. 2. As shown in FIG. 9, the grating period T has a gradual change from 8.6 μm at the top, to 9.6 μm at the bottom. This grating has a focal length of 25 cm and optics diameter of 5.1 cm and was made using about 3 million rectangular flashes. Each rectangular flash is 4.5×30 μm.

As mentioned in the discussion on FIG. 2, the synthetic lenses 201 and 202 are planned to be used in laser radar systems with laser beams having a wavelength of $\lambda = 10.6$ μm. The design geometry of FIG. 2 subjects the primary mirror 201 to an incident angle $\phi = 47.6°$, and a diffraction angle $\psi = 26.1°$. Therefore, the phase contour θ for the primary mirror 201 with no paraxial approximation is calculated from the following:

$$\theta = \frac{2\pi}{\lambda} \left[ \sqrt{x_x^2 + (y_c + f\sin\psi)^2 + (f\cos\psi)^2} - y_c \sin\phi - f \left[ \frac{\cos}{\cos\phi} tg \phi \sin(\phi - \psi) \right] \right] \quad \text{Equation 10}$$

The fabrication process, disclosed above, has shown that the minor perturbations of a lens pattern on the straight-groove assumptions in established EM theories do not result in unacceptable losses in diffraction efficiency. These results can also, of course, be extended to scanner patterns and other optical functions. Therefore, the fabrication process of the present invention may also be used to fabricate optical elements with curvilinear groove patterns such as: beam multiplexers, beam profile shaper elements, planar lenses and IR filters, as well as the straight-groove optical gratings addressed above.

Additionally, it should be reemphasized that the fabrication process of the present invention fabricates high efficiency optical gratings which operate in the EM domain. This is made possible since the inverse of the grating periodicity (1/T) exceeds the spatial frequency of the illuminating wavefront. In other words, the grating is designed so that T is less than or equal to λ, the wavelength of the incident wavefront.

FIG. 11 is a sketch of a high efficiency binary planar lens produced by the present invention. As discussed above in conjunction with FIG. 5, the binary lens 1601 has a grating pattern which serves to reflect all incident radiation 1602 to a focal point 1603.

As mentioned above, the manufacturing process of the present invention is capable of producing a highly efficient diffractive optical elements which, due to the design of their grating pattern, are capable of containing spacially variant signal processing functions. These optical elements include, but are not limited to: beam profile shapers, beam multiplexers, IR filters and binary lenses. While conventional versions of the above elements are known in the art, the fabrications process of the present invention produces these diffractive elements so that they possess diffraction efficiencies exceeding those of the prior art elements.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process of fabricating a high efficiency binary planar optical element which diffracts an illuminating wavefront having a wavelength with a distance of λ, said binary planar optical element having a reflective grating with a periodicity of distance T formed by a plurality of rectangular grooves and plurality of rectangular walls, said fabricating process comprising the steps of:

preparing a mask by etching a lithographic mask pattern upon a positive resist layer which coats a first substrate, said lithographic mask pattern being prepared with feature sizes as small as 0.25 microns, and a positional accuracy of 0.05 microns using an electron beam pattern generator;

producing a finished mask by chromium etching said lithographic mask pattern on said positive resist on said first substrate to produce a finished mask pattern which has transparent areas corresponding to all troughs of said plurality of rectangular grooves and darkened areas corresponding to all walls of said rectangular grooves, said transparent areas and said darkened areas corresponding to said reflective grating with said periodicity of distance T wherein said distance T approaches said wavelength distance λ said darkened areas being coated with a layer of chromium which covers only said darkened areas, said layer of chromium blocking illumination which comes from above said mask while said transparent areas permitting illumination to pass through said mask;

preparing a second substrate for receipt of said lithographic mask pattern by coating said second substrate with a thick layer of resist, said thick layer of resist being coated by an aluminum layer, said aluminum layer being coated by a layer of photoresist;

placing said finished mask over said second substrate, said second substrate having been already coated on its top surface with said layer of photoresist, wherein said second substrate is a material selected from a group consisting of: quartz, silicon, plastic, and glass;

exposing the finished mask to incoherent ultraviolet light to print the lithographic mask pattern on said layer of photoresist;

wet etching the lithographic mask pattern onto said aluminum layer on said second substrate by exposing said second substrate to a wet etchant that transmits the lithographic mask pattern onto said aluminum layers;

forming by reactive-ion etching troughs and walls in said thick layer of resist of said second substrate corresponding to said troughs and walls of said finished mask, said troughs and walls on said second substrate defining a plurality of rectangular grooves on said second substrate; and depositing a reflective coating on said rectangular grooves in said thick layer of resist, said aluminum layer and said second substrate, said reflective coating forming said reflective grating of said binary planar optical element, and wherein said reflective coating is a material selected from a metal group consisting of: chromium, gold, aluminum, copper, nickel and silver.

* * * * *